V. L. KING.
REFRIGERATING AND HARDENING CABINET.
APPLICATION FILED JUNE 19, 1917.
1,269,716.
Patented June 18, 1918.
2 SHEETS—SHEET 1.
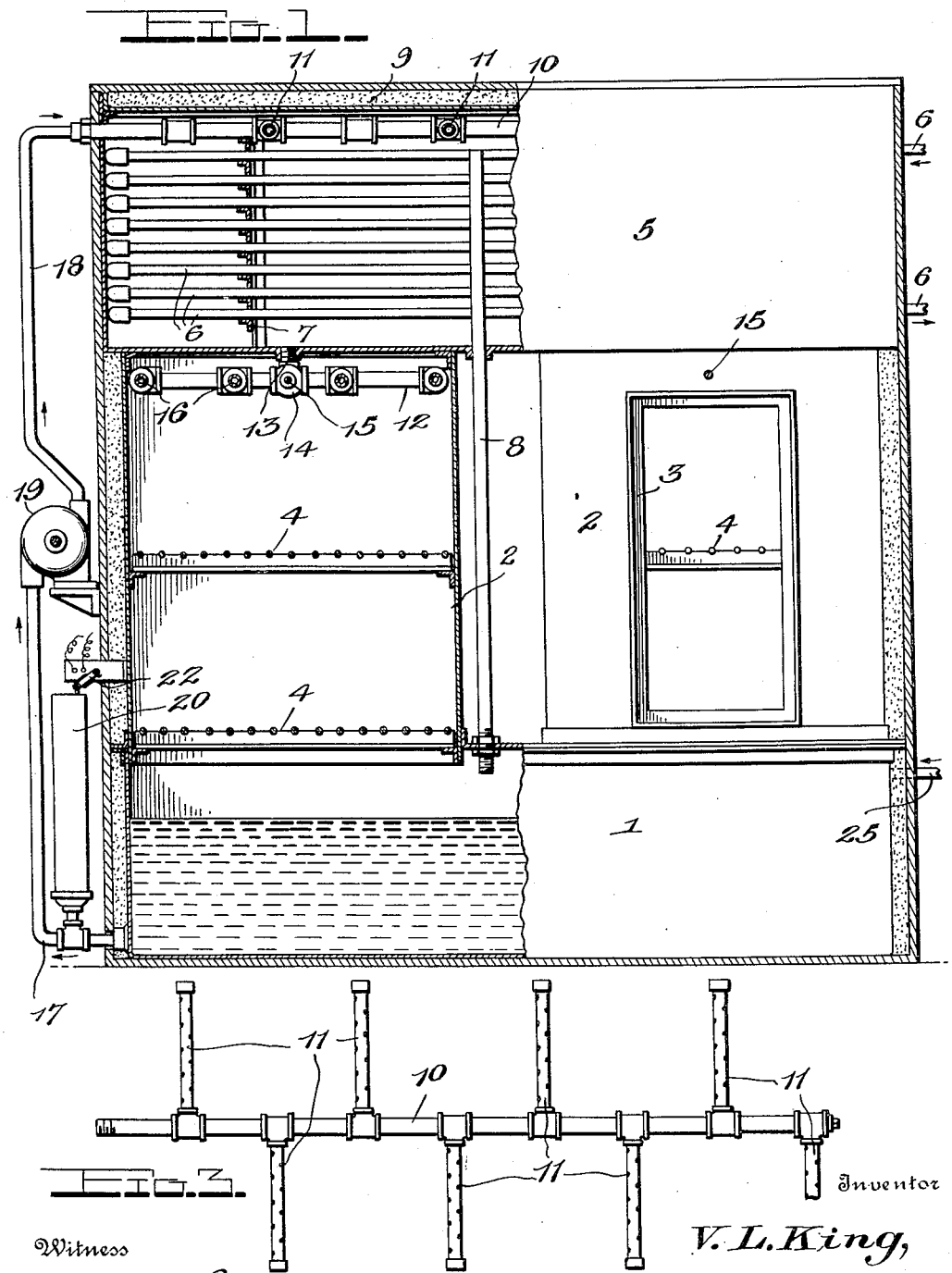
Witness
Chas. L. Griesbauer.
Inventor
V. L. King,
By G. B. McBath
Attorney

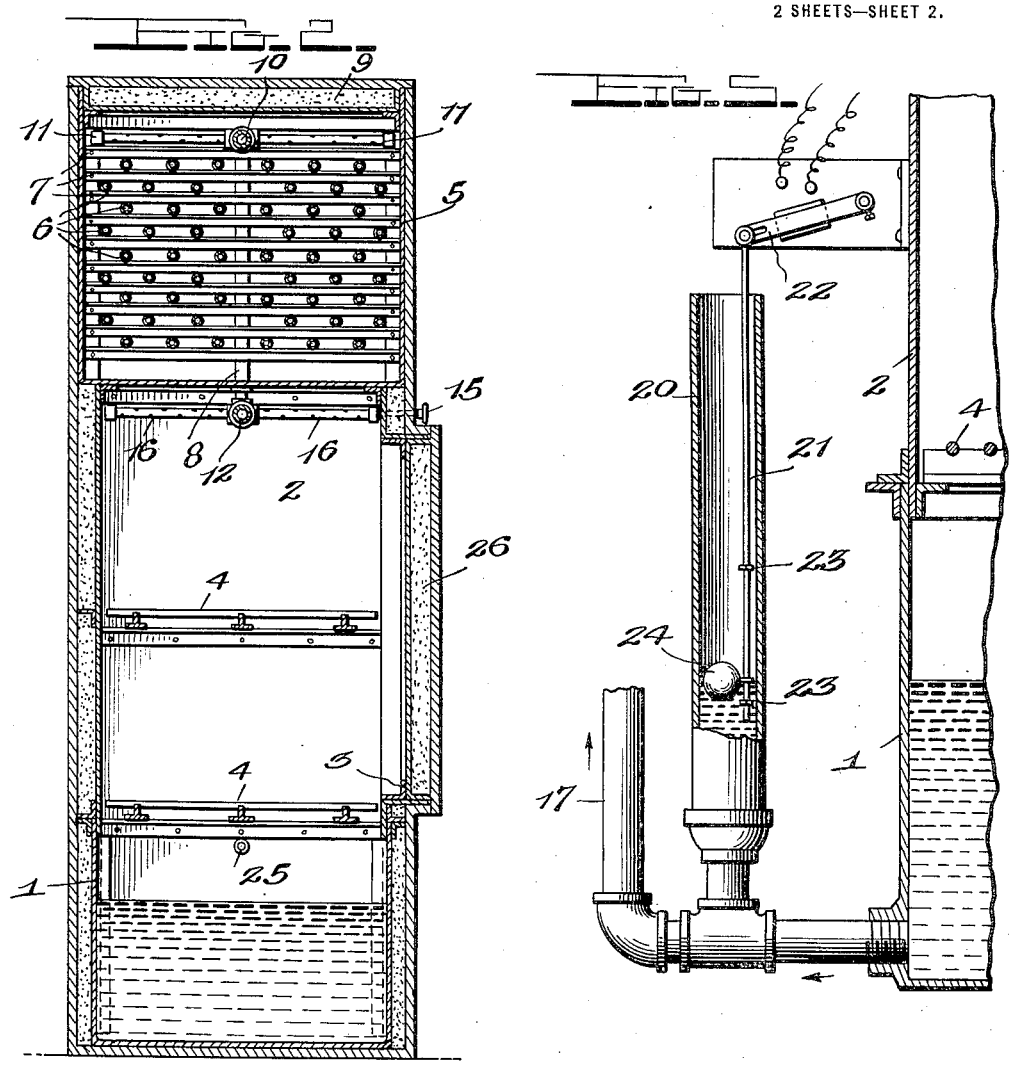
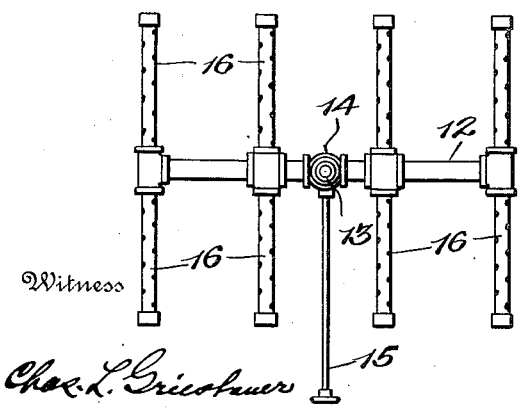

UNITED STATES PATENT OFFICE.

VICTOR L. KING, OF WEST POINT, MISSISSIPPI.

REFRIGERATING AND HARDENING CABINET.

1,269,716.  Specification of Letters Patent.  Patented June 18, 1918.

Application filed June 19, 1917. Serial No. 175,601.

*To all whom it may concern:*

Be it known that I, VICTOR L. KING, a citizen of the United States, residing at West Point, in the county of Clay and State of Mississippi, have invented certain new and useful Improvements in Refrigerating and Hardening Cabinets, of which the following is a specification.

This invention relates to a refrigerating cabinet for the purpose of hardening, freezing or cooling ice cream, sherbets, or other delicacy or food product which requires to be hardened, frozen or cooled. It is especially adapted for hardening ice cream and sherbets and will be described as adapted for that purpose.

The invention consists in the novel features of construction hereinafter described, pointed out in the claims and shown in the accompanying drawings, in which:

Figure 1 is a front elevation partly in section, and with a door removed.

Fig. 2 is a transverse, vertical section through one of the cabinets.

Fig. 3 is a plan view of an upper series of brine pipes.

Fig. 4 is a plan view of a lower series of brine pipes.

Fig. 5 is an enlarged sectional view illustrating a motor controlling device.

In these drawings I have illustrated only one form that the invention can take as it will be obvious that changes in details and arrangements of parts would be required in adapting the invention to different sizes or in installing in different buildings or locations.

Broadly speaking the invention consists in a base tank 1 open at the top and of any desired size. Upon this tank 1 are placed the hardening cabinets 2 which open downwardly having free communication with the tank.

As both are of metal they might be formed together but for convenience in manufacture and assembling it is preferable to make them separate as shown. It will also be noted that the cabinets, two of which are shown are slightly spaced apart. Any number of cabinets may be employed according to the length of the tank 1 and the size of the plant to be operated.

In said cabinets are placed racks 4. I have shown two racks in each cabinet but the number is immaterial.

On the top of the cabinets rests an upper tank 5, approximately the same size as the tank 1. In said tank 5 supported by brackets 7 are ammonia pipes 6, though any freezing fluid may be used. These pipes may be formed in coils of any desired kind. An overflow pipe 8 is arranged in the space between the cabinets and conducts any overflow of liquid from the tank 5 to the tank 1. The ammonia pipes run to any suitable source of supply, and to any desired refrigerating machine, not shown. Or they may be, and frequently will be, connected to a cold storage or ice making system. The tanks and cabinets above described are insulated and inclosed at the sides and top as at 9, by any desired means, such as cork boards, packing etc.

In the upper part of the tank 5 and extending from end to end of the tank and above the ammonia pipes is a brine pipe 10 provided with a number of lateral branches 11 perforated to discharge a spray of brine on the ammonia pipes.

In the upper part of each cabinet is a brine pipe 12 connected with the tank 5 by a short supply pipe 13 and provided with a globe valve 14 the stem 15 of which extends through the front of the cabinet so that said valve can be opened or closed from the exterior.

The pipes 12 have perforated laterals 16. The material to be hardened, frozen or cooled is placed in metal cans, not shown, on the racks 4 and the brine from the laterals 16 are sprayed on and around said cans or containers, from whence it drips into the tank 1.

From said tank it is reconveyed by pipes 17 and 18 back to the tank 5 through the agency of a pump 19. This pump may be driven in any desired manner but an electric motor is the preferred form. Where such motor is used it is not necessary that it run continuously and to save current I have devised an automatic starting and stopping device consisting of an upright pipe 20 connected to the pipe 17 and in which the brine will stand at the same level as in the tank 1. A rod 21 is connected to an electric switch 22 and is provided with spaced fixed collars 23. A float 24 is placed in the pipe and travels loosely on the rod between said collars. When the brine in the tank 1 and pipe 20 reaches a certain depth the float will engage the upper collar and further rise of brine in the pipe 20 will cause the float to lift the rod thereby closing the switch and starting the pump. The reverse operation takes place on fall of the brine level to a certain point. A brine supply pipe 25 extends into one end of the tank 1.

It will be noted that by this construction I can by means of the separate cabinets and the valves 14 cut off the supply of brine to parts of the device, using only one of the cabinets at a time if wished. If material is being removed from a cabinet, for example, the valve in that cabinet can be closed, without interfering with the circulation of brine through the other one.

The overflow pipe 8 takes care of any brine collecting in the tank 5 during closure of one or all of the valves 14. These valves also allow for the maintaining of a low temperature in the cabinets during the night without continuous running of the pump 19, as for example the tank 5 may be allowed to fill with brine and then the valves opened partially. This will feed the brine slowly to the containers in the cabinet, and the pump will remain idle until enough brine has accumulated in the tank 1 to again start it, and with low temperature in the cabinet to start on, very little brine will be required throughout the night to maintain that temperature. This ability to cut off any particular cabinet, to control the feed to both or either of them, to save current by running the pump only when necessary, and to operate the valves without opening the cabinets are the most obvious advantages of my hardening cabinets.

Suitable doors 26 are employed for the openings 3 of the cabinets, the doors being also insulated, and hinged and fastened in any desired manner.

What I claim is:—

1. In a device of the kind described, upper and lower tanks, a pipe coil adapted to contain a freezing fluid therein, a brine spraying device arranged in the upper tank and above said freezing coils, cabinets arranged between said tanks and having free communication with the lower one, a brine spraying device arranged in the upper portion of each cabinet, and means for pumping the discharged brine from the lower tank back to the upper spraying device.

2. A device of the kind described comprising a suitable casing divided into compartments, upper and lower brine spraying devices, means for conveying brine sprayed from the lower device back to the upper device, ammonia pipes arranged below the upper brine spraying device, and container racks arranged below the lower spraying device.

3. A device of the kind described comprising a base tank, hardening cabinets resting thereon and communicating therewith, an ammonia coil arranged above said cabinets, means for discharging brine on said coils, means for collecting the brine so discharged and respraying in said cabinets, means for collecting the brine sprayed in said cabinets and returning the same to the first mentioned discharging means, and exteriorly operated valves regulating the spraying of brine in said cabinets.

4. A refrigerating device of the kind described comprising upper and lower tanks, an overflow pipe connecting the two tanks, ammonia or equivalent coils in the upper tank, a brine pipe therein provided with perforated laterals arranged above the ammonia pipes and discharging thereon, cabinets arranged between the two tanks and having free communication with the lower one, brine pipes with perforated laterals arranged respectively in the upper portion of each cabinet, and discharging therein, valves controlling passage of brine from the upper tank to the last mentioned brine pipes, said valves being exteriorly operated, and means for pumping brine from the lower collecting tank to the brine pipe of the upper tank.

In testimony whereof I affix my signature.

VICTOR L. KING.